US012583525B2

(12) United States Patent
Chang et al.

(10) Patent No.: US 12,583,525 B2
(45) Date of Patent: Mar. 24, 2026

(54) SIDE STRUCTURE OF VEHICLE BODY

(71) Applicants: Hyundai Motor Company, Seoul (KR); Kia Corporation, Seoul (KR); KOLON SPACEWORKS CO., LTD., Gyeongsangnam-do (KR)

(72) Inventors: Jin Han Chang, Ansan-si (KR); Minsoo Kim, Suwon-si (KR); Yoonkyoung Han, Suwon-si (KR); Jae Kuk Park, Seoul (KR); Chang Hee Lee, Seoul (KR)

(73) Assignees: Hyundai Motor Company, Seoul (KR); Kia Corporation, Seoul (KR); KOLON SPACEWORKS CO, LTD., Gyeongsangnam-Do (KR)

( * ) Notice: Subject to any disclaimer, the term of this patent is extended or adjusted under 35 U.S.C. 154(b) by 377 days.

(21) Appl. No.: 18/345,058

(22) Filed: Jun. 30, 2023

(65) Prior Publication Data

US 2024/0190507 A1 Jun. 13, 2024

(30) Foreign Application Priority Data

Dec. 7, 2022 (KR) ........................ 10-2022-0169518

(51) Int. Cl.
*B62D 25/02* (2006.01)
*B60R 13/07* (2006.01)
(Continued)

(52) U.S. Cl.
CPC ............ *B62D 25/025* (2013.01); *B60R 13/07* (2013.01); *B62D 25/04* (2013.01); *B62D 25/16* (2013.01)

(58) Field of Classification Search
CPC ...... B62D 25/025; B62D 25/16; B62D 25/02; B62D 29/005; B62D 29/043; B62D 29/048; B60R 13/07
(Continued)

(56) References Cited

U.S. PATENT DOCUMENTS 5,785,378 A * 7/1998 Seefried ................. B62D 25/02
296/203.03
5,857,732 A * 1/1999 Ritchie .................. B60J 5/0433
49/502
(Continued)

FOREIGN PATENT DOCUMENTS

JP 2003518575 A 6/2003
KR 20210134388 A 11/2021

OTHER PUBLICATIONS

EP1584517 and English translation; Schultze et al.; Dec. 10, 2005 (Year: 2025).*

*Primary Examiner* — Roger L Pang
(74) *Attorney, Agent, or Firm* — SLATER MATSIL, LLP

(57) ABSTRACT

An embodiment side structure of a vehicle body includes a side body, a surround panel coupled to the side body and having an opening, and a side outer panel including a plastic composite material coupled to the surround panel. In an embodiment, the surround panel includes a plurality of pillar reinforcement parts coupled to a plurality of pillars provided on the side body, a side sill reinforcement part coupled to a side sill provided on the side body and connected to the plurality of pillar reinforcement parts, and a rear wheel arch reinforcement part coupled to a rear wheel arch provided on the side body and connected to the plurality of pillar reinforcement parts.

15 Claims, 8 Drawing Sheets

(51) Int. Cl.
 *B62D 25/04* (2006.01)
 *B62D 25/16* (2006.01)
(58) Field of Classification Search
 USPC ...................................................... 296/187.12
 See application file for complete search history.

(56) References Cited

U.S. PATENT DOCUMENTS

| | | |
|---|---|---|
| 7,337,588 B1 | 3/2008 | Moebus |
| 8,166,723 B2 | 5/2012 | Moriau et al. |
| 2003/0102697 A1* | 6/2003 | Yakata ................... B62D 25/04 |
| | | 296/209 |
| 2005/0046238 A1* | 3/2005 | Miyoshi ............. B62D 25/2036 |
| | | 296/203.03 |
| 2011/0057476 A1* | 3/2011 | Beck ................... B62D 29/007 |
| | | 296/181.1 |
| 2017/0073017 A1* | 3/2017 | Steffens ................ B62D 25/04 |
| 2021/0284246 A1* | 9/2021 | Brandley .............. B62D 21/15 |
| 2022/0205253 A1 | 6/2022 | Zorn |

\* cited by examiner

SIDE STRUCTURE OF VEHICLE BODY

CROSS-REFERENCE TO RELATED APPLICATIONS

This application claims the benefit of Korean Patent Application No. 10-2022-0169518, filed on Dec. 7, 2022, which application is hereby incorporated herein by reference.

TECHNICAL FIELD

An embodiment of the present invention relates to a vehicle body of a vehicle.

BACKGROUND

Recently, the automobile industry is introducing a new concept of future mobility vision for realization of a human-centered, dynamic future city. One of these future mobility solutions is a purpose built vehicle (PBV) as a purpose-based mobility.

The PBV may be an example of an electric vehicle (EV)-based eco-friendly mobile vehicle. These PBVs may provide various customized services to users while moving from a ground to a destination in an unmanned or manned autonomous driving method. The PBV may be configured in various forms according to a type of customized service.

In one example, the PBV is being manufactured in a one box design with a large indoor space. A vehicle body of such a PBV includes an underbody (commonly referred to as a rolling chassis, a skateboard, or a chassis frame) and an upper body assembled to the underbody.

Here, the upper body includes a body frame and a plurality of side outer panels assembled to the body frame. In one example, as the plurality of side outer panels, a panel made of a press-formed steel material through a press mold has been applied.

In order to mold the plurality of side outer panels made of the steel material, it is necessary to develop a press mold corresponding to each of the plurality of side outer panels. However, the development period of the press mold is long, and development costs are also excessive. Furthermore, a painting process for painting a plurality of side outer panels made of the press-formed steel material is also required.

Accordingly, in recent years, a plastic composite material panel molding technology has been introduced that is advantageous for small scale production of a plurality of side outer panels, may promote weight reduction of a vehicle body, and does not require painting.

The above information disclosed in this background section is only for enhancement of understanding of the background of embodiments of the invention and therefore it may contain information that does not form the prior art that is already known to a person of ordinary skill in the art.

SUMMARY

An embodiment of the present invention relates to a vehicle body of a vehicle. Particular embodiments relate to a side structure of a vehicle body applied to a purpose built vehicle (PBV).

Embodiments of the present disclosure provide a side structure of a vehicle body capable of promoting weight reduction of the vehicle body and securing coupling rigidity and watertight performance.

According to an embodiment of the present invention, a side structure of a vehicle body disposed on both sides of the vehicle body along a vehicle width direction may include i) a side body, ii) a surround panel coupled to the side body and having an opening, and iii) a side outer panel made of a plastic composite material coupled to the surround panel.

The surround panel may include a plurality of pillar reinforcement parts coupled to a plurality of pillars provided on the side body, a side sill reinforcement part coupled to a side sill provided on the side body and connected to the plurality of pillar reinforcement parts, and a rear wheel arch reinforcement part coupled to a rear wheel arch provided on the side body and connected to the plurality of pillar reinforcement parts.

The side outer panel may be coupled to an edge portion of the opening of the surround panel by an adhesive.

According to another embodiment of the present invention, a side structure of a vehicle body disposed on both sides of the vehicle body along a vehicle width direction may include i) a side body, ii) a surround panel coupled to the side body and having a plurality of openings, iii) a plurality of side outer panels made of a plastic composite material and coupled to the surround panel; and iv) a water drain unit formed on the surround panel.

The surround panel may include a panel mounting part formed at outer edges of the plurality of openings to be bonded to the plurality of side outer panels by an adhesive.

The surround panel may include a reinforcement part extending from the panel mounting part and formed in a step shape at inner edges of the plurality of openings.

The water drain unit may include a water pass part formed on an outer edge of the panel mounting part.

The water pass part may extend from outer edges of the plurality of openings between panel mounting parts adjacent to each other.

The water drain unit may further include a plurality of water drain grooves connected to the water pass part in a vertical direction under the surround panel.

The surround panel may include a plurality of pillar reinforcement parts, a side sill reinforcement part, and a rear wheel arch reinforcement part.

The plurality of water drain grooves may be formed in the side sill reinforcement part and the rear wheel arch reinforcement part under the plurality of openings.

The side structure of a vehicle body may further include a panel coupling unit formed at edge portions of the plurality of side outer panels adjacent to each other.

The panel coupling unit may include a fitting protrusion formed on one edge portion and a fitting groove formed on the other edge portion and coupled to the fitting protrusion at the edge portions of the plurality of side outer panels adjacent to each other.

The fitting protrusion may be coupled to the fitting groove along a vehicle width direction.

The fitting protrusion may include a water guide part bent in a side inner direction at one edge portion and connected to a parting line of the plurality of side outer panels adjacent to each other and a water blocking part bent in a side outer direction from the water guide part and coupled to the fitting groove along a vehicle width direction.

The fitting groove may be provided with a round-shaped fitting guide part to guide the fitting protrusion.

Each of the plurality of side outer panels may include a plate part and a reinforcement layer formed on the plate part.

According to embodiments of the present invention, it is possible to promote the weight reduction of the vehicle body by applying the side outer panel of the plastic composite material, secure the coupling rigidity of the side outer panel, and improve the watertight performance of the side structure.

Other effects that may be obtained or are predicted by exemplary embodiments will be explicitly or implicitly described in a detailed description of the exemplary embodiments. That is, various effects that are predicted according to exemplary embodiments will be described in the following detailed description.

BRIEF DESCRIPTION OF THE DRAWINGS

Since the accompanying drawings are provided only to describe exemplary embodiments of the present invention, it is not to be interpreted that the spirit of embodiments of the present invention is limited to the accompanying drawings.

FIG. 1 is a side view illustrating a side structure of a vehicle body according to an embodiment of the present invention.

Figure 2:
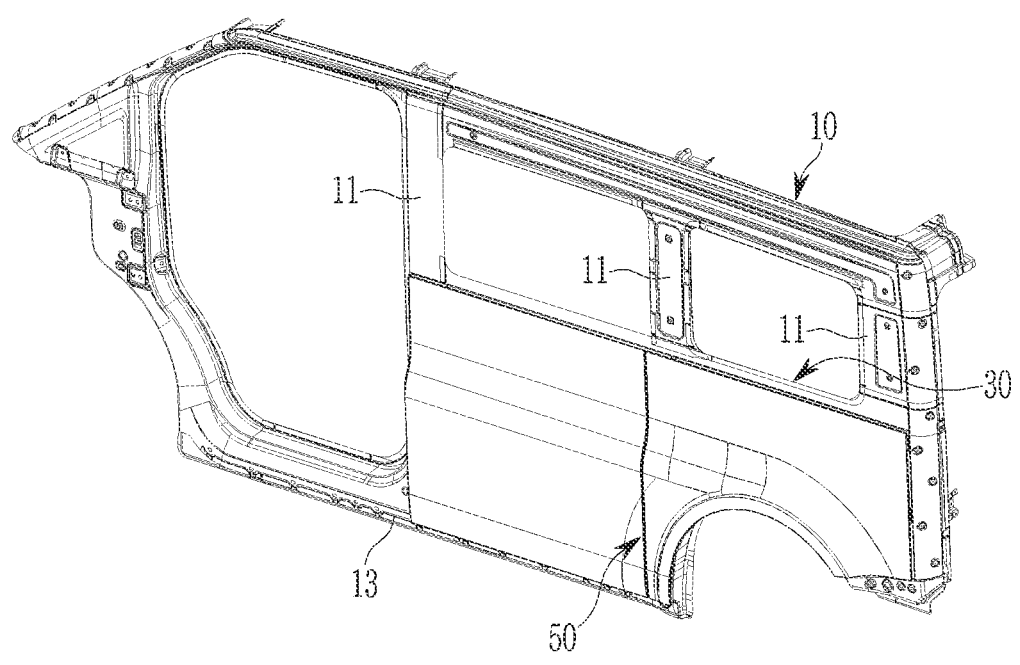
FIG. 2 is a combined perspective view illustrating the side structure of a vehicle body according to an embodiment of the present invention.

It should be understood that the drawings referenced above are not necessarily drawn to scale and present rather simplified representations of various preferred features illustrating the basic principles of embodiments of the present invention. For example, specific design features of embodiments of the present invention, including specific dimensions, direction, position, and shape, will be determined in part by specific intended applications and use environments.

The following reference identifiers may be used in connection with the figures to describe exemplary embodiments of the present invention.

| | |
|---|---|
| 1: Upper body | 10: Side body |
| 11: Pillar | 13: Side sill |
| 15: Rear wheel arch | 30: Surround panel |
| 31: Opening | 33: Pillar reinforcement part |
| 35: Side sill reinforcement part | 37: Rear wheel arch reinforcement part |
| 41: Panel mounting part | 43: Reinforcement part |
| 50, 150: Side outer panel | 51: Adhesive |
| 53: Plate part | 55: Reinforcement layer |
| 60: Water drain unit | 61: Water pass part |
| 63: Water drain groove | 80: Panel coupling unit |
| 81: Fitting protrusion | 83: Fitting groove |
| 85: Water guide part | 87: Water blocking part |
| 89: Fitting guide part | 100, 200: Side structure of vehicle body |
| 152: Parting line | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. However, embodiments of the present disclosure may be implemented in various different forms and are not limited to the exemplary embodiments described herein.

The terminology used herein is for the purpose of describing particular embodiments only and is not intended to limit the embodiments of the present disclosure. As used herein, singular forms are intended to also include plural forms, unless the context clearly dictates otherwise.

The terms 'comprises' and/or 'comprising' as used herein indicate the presence of specified features, integers, steps, operations, elements, and/or components, but should also be understood as not excluding the presence or addition of one or more other features, integers, steps, operations, components, and/or groups thereof.

As used herein, the term "and/or" includes any one or all combinations of one or more of the associated listed items.

In this specification, the term 'coupled' refers to a physical relationship between two components in which components are directly connected to each other by welding, self piercing rivet (SPR), flow drill screw (FDS), structural adhesive, etc., or indirectly connected through one or more intermediate components.

As used herein, 'vehicle', 'of vehicle', 'automobile', or other similar terms as used herein generally include passenger automobiles, including a passenger vehicle, a sport utility vehicle (SUV), a bus, a truck, and various commercial vehicles, and include a hybrid vehicle, an electric vehicle, a hybrid electric vehicle, an electric vehicle-based purpose built vehicle (PBV), a hydrogen-powered vehicle, and other alternative fuel vehicles (e.g., fuel derived from resources other than petroleum).

Hereinafter, embodiments of the present invention will be described in detail with reference to the accompanying drawings.

Figure 1:
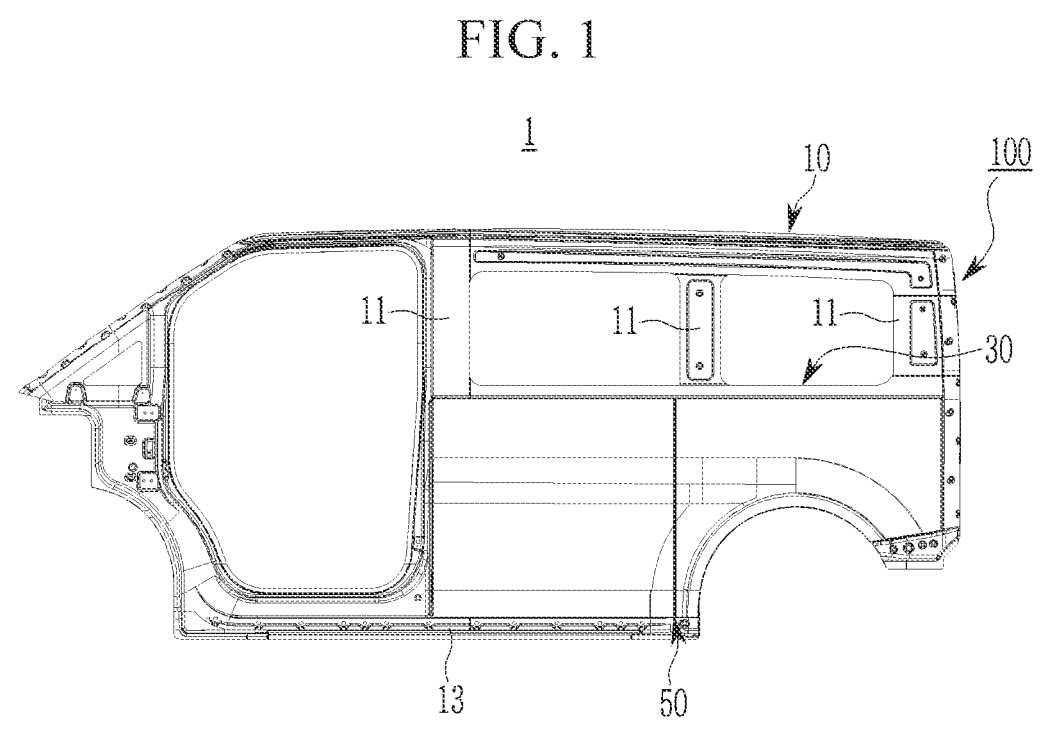

FIG. 1 is a side view illustrating a side structure of a vehicle body according to an embodiment of the present invention.

Referring to FIG. 1, a side structure 100 of a vehicle body according to an embodiment of the present invention may be applied to a vehicle body of, for example, a purpose built vehicle (hereinafter referred to as a 'PBV').

In one example, the PBV may be used as an electric vehicle-based life module vehicle that provides various services to passengers while moving from a ground to a destination in an unmanned autonomous driving method. The life module vehicle described above is also commonly referred to as a 'robo taxi,' 'robo shuttle,' or 'hailing vehicle' by those skilled in the art.

Such a PBV may be manufactured in a one box design with a wide indoor space. In addition, the PBV may apply a facing type seat to provide a wide indoor space.

The vehicle body of the PBV includes a skateboard type underbody (not illustrated) (commonly referred to as a 'rolling chassis' or 'chassis frame' by those skilled in the art) and an upper body 1 assembled to the underbody.

A battery assembly (not illustrated) and a driving motor (not illustrated) may be mounted on the underbody. In addition, the upper body 1 is a body-in-white (BIW) body coupled to the underbody and may configure a cabin with a wide indoor space.

In the present specification, reference directions for describing the following components may be set as a front-rear direction (e.g., a length direction or a longitudinal direction of a vehicle body), a vehicle width direction (e.g., a lateral direction or a left-right direction), and a vertical direction (e.g., height direction) of a vehicle body, based on the vehicle body.

In addition, in this specification, 'upper end portion', 'upper portion', 'upper end', or 'upper surface' of a component refers to an end portion, a portion, an end, or a surface of a component located on a relatively upper side in the drawing, and 'lower end portion', 'lower portion', 'lower end', or 'lower surface' of the component refers to an end portion, a portion, an end, or a surface of a component located on a relatively lower side in the drawings.

Furthermore, in the present specification, an end (e.g., one end, another end, or both ends, etc.) of a component refers to an end of the component in any one direction, and an end portion (e.g., one end portion, another end portion, both end portions, a front end portion, a rear end portion, etc.) of a component refers to a certain portion of a component that includes that end.

Meanwhile, the upper body 1 as described above includes the side structure 100 of the vehicle body according to embodiments of the present invention and a loop structure (not illustrated) coupled to an upper portion of the side structure 100.

The side structures 100 of the vehicle body according to the embodiments of the present invention are respectively disposed on both sides of the vehicle body along a vehicle width direction, are coupled to the underbody (not illustrated), and are disposed along the front-rear direction of the vehicle body.

The side structure 100 of the vehicle body according to the embodiments of the present invention is configured to promote weight reduction of the vehicle body and secure coupling rigidity and watertight performance.

Figure 3:
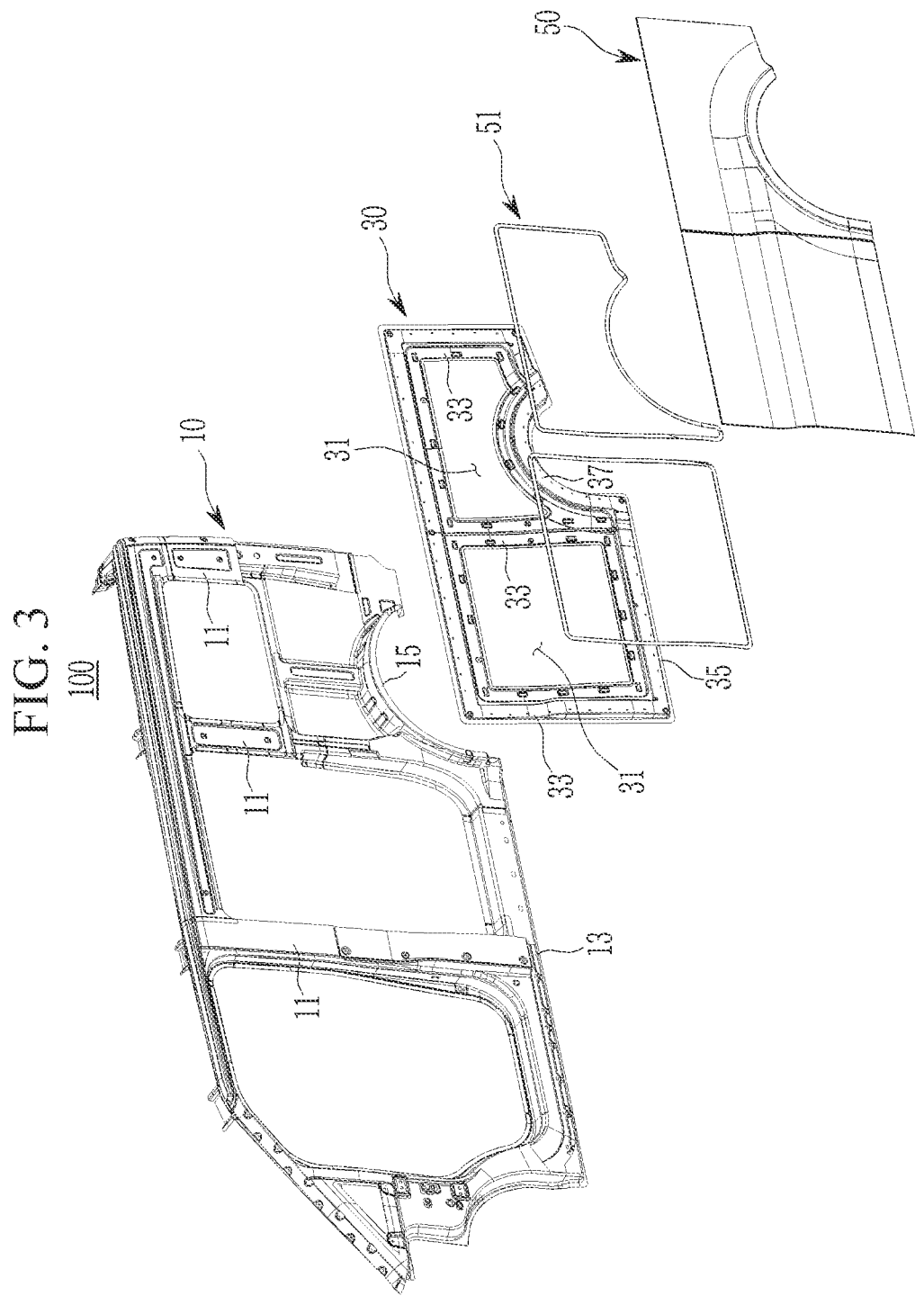
FIG. 3 is an exploded perspective view illustrating the side structure of a vehicle body according to an embodiment of the present invention.

FIG. 2 is a combined perspective view illustrating the side structure of the vehicle body according to an embodiment of the present invention. FIG. 3 is an exploded perspective view illustrating the side structure of the vehicle body according to an embodiment of the present invention.

Referring to FIGS. 1 to 3, the side structure 100 of the vehicle body according to an embodiment of the present invention basically includes a side body 10, a surround panel 30, and a side outer panel 50.

In an embodiment of the present invention, the side body 10 may be provided as a side frame constituting a side skeleton of the vehicle body. In one example, the side body 10 may be made of a steel material. In another example, the side body 10 may include a plurality of pillars 11, a side sill 13, and a rear wheel arch 15.

The plurality of pillars 11 are disposed along the vertical direction. In one example, the plurality of pillars 11 may apply fixed glass to an unapplied part (e.g., a doorless part) of a door.

Also, the side sill 13 and the rear wheel arch 15 may be coupled to lower portions of the plurality of pillars 11.

In an embodiment of the present invention, the surround panel 30 is designed to secure connection robustness and rigidity of the side body 10 to which the fixed glass is applied. Furthermore, the surround panel 30 is configured to couple (e.g., mount) a side outer panel 50 to be described later to the side body 10.

The surround panel 30 is made of a steel material. The surround panel 30 may be coupled to the lower side of the side body 10, to which the fixed glass is applied, by welding. The surround panel 30 includes an opening 31 formed inside an edge.

Here, the opening 31 may be provided in plurality. In one example, the plurality of openings 31 may be provided as a pair adjacent to each other.

Such a surround panel 30 includes a plurality of pillar reinforcement parts 33, a side sill reinforcement part 35, and a rear wheel arch reinforcement part 37.

The plurality of pillar reinforcement parts 33 may be coupled to the plurality of pillars 11 of the side body 10 by welding. The side sill reinforcement part 35 may be coupled to the side sill 13 of the side body 10 by welding and may be connected to the lower portions of the plurality of pillar reinforcement parts 33. The rear wheel arch reinforcement part 37 may be coupled to the rear wheel arch 15 of the side body 10 by welding and may be connected to the lower portions of the plurality of pillar reinforcement parts 33.

In an embodiment of the present invention, the side outer panel 50 is configured to form a skin surface of the side structure 100. The side outer panel 50 may be made of a plastic composite material.

Here, the side outer panel 50 may be provided as a plastic composite material panel of a predetermined color including a plurality of resin layers sequentially stacked with respect to the skin surface.

The side outer panel 50 may be provided in plurality to close each of the plurality of openings 31. In one example, the plurality of side outer panels 50 may be provided as a pair adjacent to each other at positions corresponding to the plurality of openings 31.

Furthermore, the plurality of side outer panels 50 may be coupled (e.g., adhered or attached) to edge portions of the plurality of openings 31 of the surround panel 30 by an adhesive 51.

Furthermore, the plurality of side outer panels 50 may be mechanically coupled to edges of the plurality of openings 31 of the surround panel 30 by a fastening member (not illustrated). The fastening member may include a combination of a bolt, a nut, a rivet, a flow drill screw (FDS), and a clip known to those skilled in the art.

Hereinafter, a coupling structure of the surround panel 30 configured as described above and the plurality of side outer panels 50 will be described in detail with reference to the accompanying drawings.

Figure 4:
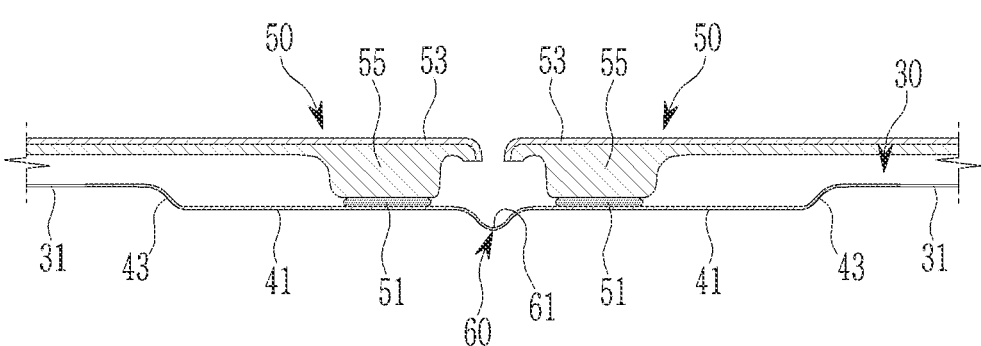
FIG. 4 is a cross-sectional view illustrating the side structure of a vehicle body according to an embodiment of the present invention.
Figure 5:
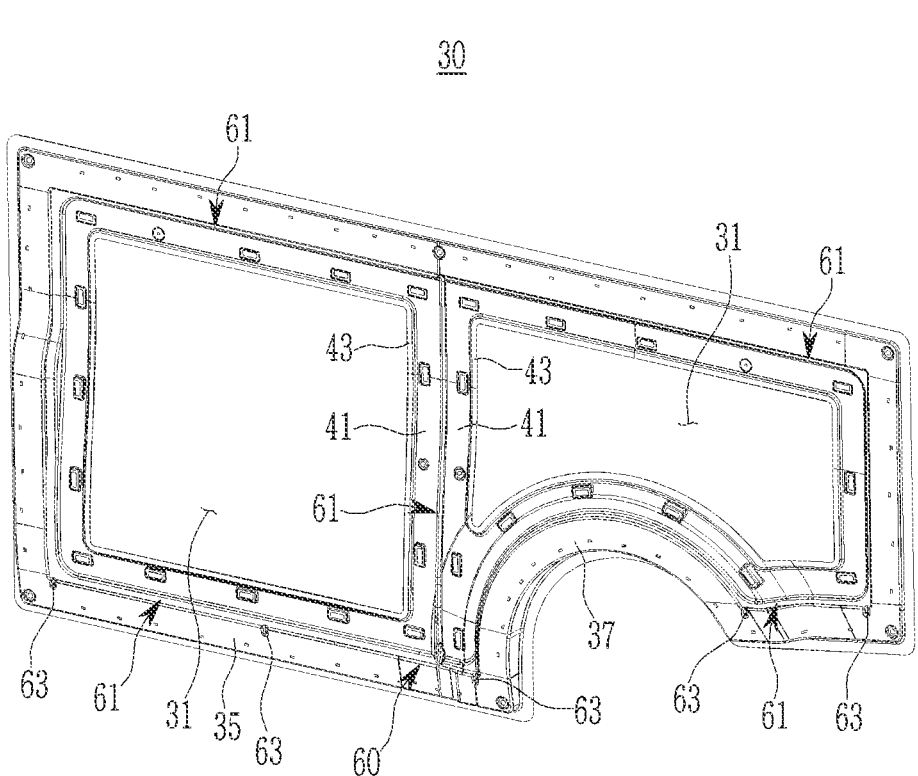
FIG. 5 is a perspective view illustrating a surround panel applied to the side structure of a vehicle body according to an embodiment of the present invention.
Figure 6:
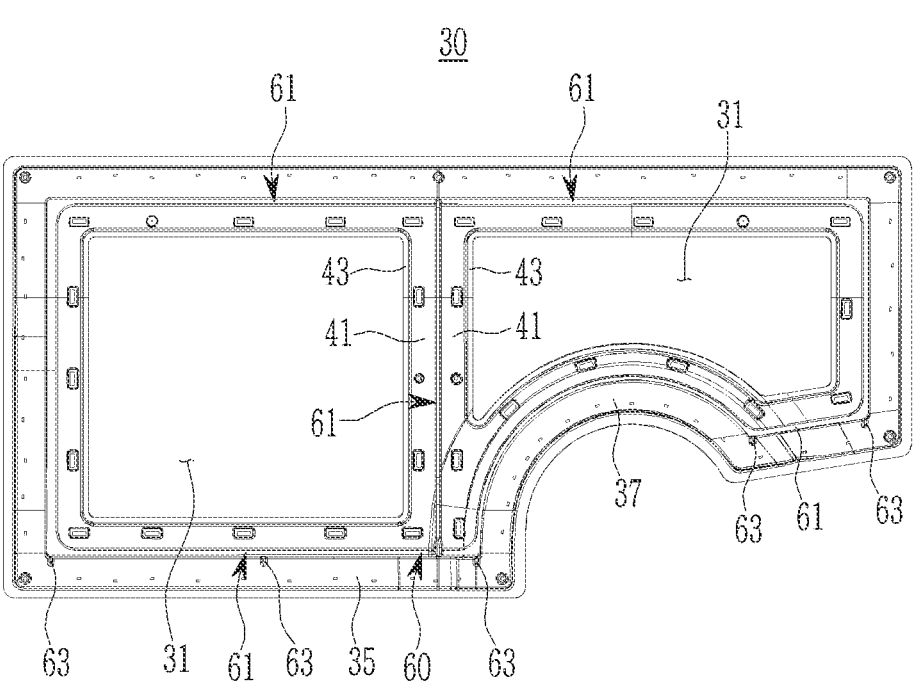
FIG. 6 is a side view illustrating the surround panel applied to the side structure of a vehicle body according to an embodiment of the present invention.

FIG. 4 is a cross-sectional view illustrating the side structure of the vehicle body according to an embodiment of the present invention. FIG. 5 is a perspective view illustrating a surround panel applied to the side structure of the vehicle body according to an embodiment of the present invention. FIG. 6 is a side view illustrating the surround panel applied to the side structure of the vehicle body according to an embodiment of the present invention.

Referring to FIGS. 4 to 6, the surround panel 30 applied to the side structure of the vehicle body according to an embodiment of the present invention includes a panel mounting part 41 and a reinforcement part 43.

The panel mounting part 41 is configured to couple the plurality of side outer panels 50 to the edge portions of the plurality of openings 31 by the adhesive 51. The panel mounting part 41 may be formed at outer edges of each of the plurality of openings 31.

The reinforcement part 43 is configured to reinforce the rigidity of the panel mounting part 41. The reinforcement part 43 extends from the panel mounting part 41 and may be formed in a step shape (or flange shape) at inner edges of the plurality of openings 31. The reinforcement part 43 may be provided in a stepwise protruding shape along a side outer direction of the panel mounting part 41.

Meanwhile, each of the plurality of side outer panels 50 as described above includes a plate part 53 and a reinforcement layer 55.

The plate part 53 includes a plurality of resin layers (not illustrated) sequentially stacked based on skin surfaces of each of the plurality of side outer panels 50. Here, the plurality of resin layers may include a colored resin layer and a transparent hard coating layer.

The reinforcement layer 55 is configured to reinforce the rigidity of the plate part 53. The reinforcement layer 55 may include a reinforcement source applied to the plate part 53 to a set thickness, for example, a fiber material and a polyurethane compound known to those skilled in the art.

Meanwhile, referring to FIGS. 4 to 6, the side structure 100 of the vehicle body according to an embodiment of the present invention further includes a water drain unit 60 formed on the surround panel 30.

In an embodiment of the present invention, the water drain unit 60 is configured to discharge water introduced between a plurality of side outer panels 50 adjacent to each other (e.g., into a parting line) through a lower portion of the surround panel 30. This water drain unit 60 includes a water pass part 61 and a plurality of water drain grooves 63.

The water pass part 61 may form a drain path through which water introduced between the plurality of side outer panels 50 adjacent to each other flows (e.g., drains) in a downward direction.

The water pass part 61 may be formed on an outer edge of the panel mounting part 41. Here, the water pass part 61 may extend between the panel mounting parts 41 adjacent to each other at the outer edges of the plurality of openings 31.

Also, the plurality of water drain grooves 63 are configured to discharge water flowing along the water pass part 61 through the lower portion of the surround panel 30.

The plurality of water drain grooves 63 may be connected to the water pass part 61 in the vertical direction under the surround panel 30. Furthermore, the plurality of water drain grooves 63 may be formed in the side sill reinforcement part 35 and the rear wheel arch reinforcement part 37 under the plurality of openings 31.

Hereinafter, the assembly process and operation of the side structure 100 of the vehicle body according to an embodiment of the present invention configured as described above will be described in detail with reference to FIGS. 1 to 6.

First, in an embodiment of the present invention, the side body 10 made of steel including the plurality of pillars 11, the side sill 13, and the rear wheel arch 15 is provided.

In an embodiment of the present invention, the surround panel 30 made of the steel material that includes the plurality of openings 31, the plurality of pillar reinforcement parts 33, the side sill reinforcement part 35, the rear wheel arch reinforcement part 37, the panel mounting part 41, the reinforcement part 43, the water pass part 61, and the plurality of water drain grooves 63 is provided.

Furthermore, in an embodiment of the present invention, the plurality of side outer panels 50 made of a plastic composite material including the plate part 53 and the reinforcement layer 55 are provided.

In this state, the surround panel 30 is coupled to the side body 10 along the vehicle width direction by welding. Here, the plurality of pillar reinforcement parts 33 are coupled to the plurality of pillars 11, the side sill reinforcement part 35 is coupled to the side sill 13, and the rear wheel arch reinforcement part 37 is coupled to the rear wheel arch 15.

Then, the plurality of side outer panels 50 are coupled to the panel mounting parts 41 respectively formed at the outer edges of the plurality of openings 31 of the surround panel 30 by the adhesive 51. The plurality of side outer panels 50 close the plurality of openings 31 while being coupled to the panel mounting part 41.

In the side structure 100 of the vehicle body according to an embodiment of the present invention assembled as described above, as the plurality of side outer panels 50 made of a plastic composite material are coupled to the surround panel 30 forming the plurality of openings 31, it is possible to promote the weight reduction (e.g., lightweight) of the vehicle body.

In addition, since the side structure 100 of the vehicle body according to an embodiment of the present invention forms the reinforcement part 43 on the surround panel 30, it is possible to reinforce the rigidity of the panel mounting part 41 to which the plurality of side outer panels 50 are coupled.

Therefore, the side structure 100 of the vehicle body according to an embodiment of the present invention may minimize the deformation of the surround panel 30, thereby securing the quality of the step of the plurality of side outer panels 50.

In addition, the side structure 100 of the vehicle body according to an embodiment of the present invention may discharge water introduced between the plurality of side outer panels 50 adjacent to each other through the water drain unit 60 of the surround panel 30.

Here, the water introduced between the plurality of side outer panels 50 adjacent to each other flows along the water pass part 61 and does not flow into the vehicle body (e.g., the interior of the vehicle body) while being discharged to the lower portion of the surround panel 30 through the plurality of water drain grooves 63.

Furthermore, even if the water flowing along the water pass part 61 flows between the plurality of side outer panels 50 adjacent to each other and the adhesive 51 and flows between the panel mounting part 41 and the adhesive 51, the water does not flow into the plurality of openings 31 of the surround panel 30 while being blocked by the reinforcement part 43.

As a result, the side structure 100 of the vehicle body according to an embodiment of the present invention may improve the watertight performance.

Figure 7:
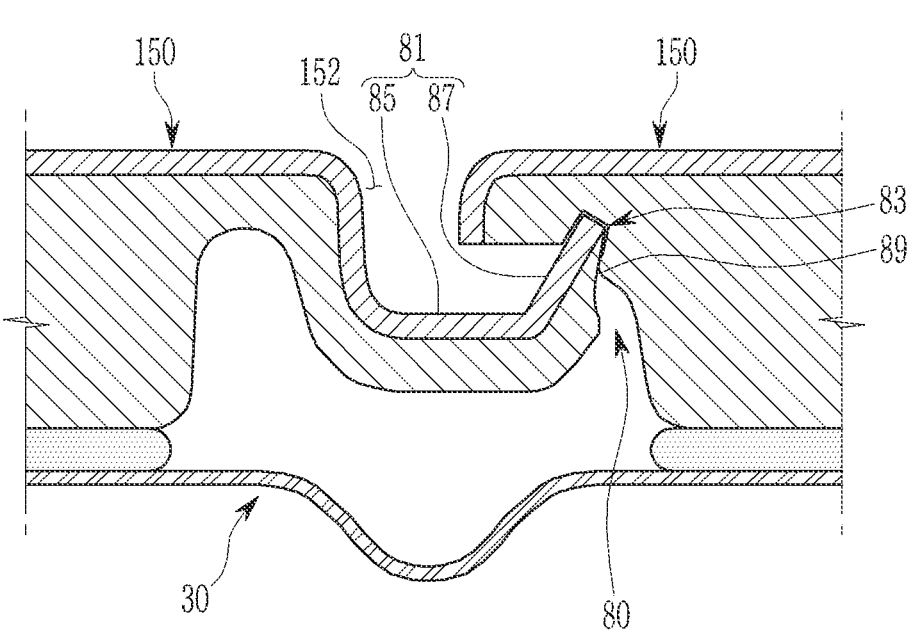
FIG. 7 is a cross-sectional view illustrating a side structure of a vehicle body according to another embodiment of the present invention.

FIG. 7 is a cross-sectional view illustrating a side structure of a vehicle body according to another embodiment of the present invention. In the drawings, the same reference numerals are assigned to the same components as those of the embodiment described above.

Referring to FIG. 7, a side structure 200 of a vehicle body according to another embodiment of the present invention includes the components of the embodiment described above and further includes a panel coupling unit 80.

In an embodiment of the present invention, the panel coupling unit 80 is configured to couple a plurality of side outer panels 150 adjacent to each other. Furthermore, the panel coupling unit 80 is designed to secure the watertight performance while reinforcing the rigidity of the plurality of side outer panels 150 coupled to the surround panel 30.

The panel coupling unit 80 may be formed at edge portions of the plurality of side outer panels 150 adjacent to each other. This panel coupling unit 80 includes a fitting protrusion 81 and a fitting groove 83.

The fitting protrusion 81 may be formed at one of edge portions of the plurality of side outer panels 150 adjacent to each other.

The fitting protrusion 81 may be formed at the other edge portion, at edge portions of the plurality of side outer panels 150 adjacent to each other. The fitting groove 83 is coupled to the fitting protrusion 81. Here, the fitting protrusion 81 may be fitted into the fitting groove 83 along the vehicle width direction.

Furthermore, the fitting protrusion 81 includes a water guide part 85 and a water blocking part 87.

The water guide part 85 is configured to guide (e.g., discharge or drain) water introduced between the plurality of side outer panels 150 adjacent to each other in a downward direction.

The water guide part 85 may be bent in the side inner direction at one edge of the plurality of side outer panels 150 adjacent to each other and may be connected to a parting line 152 of the plurality of side outer panels 150 adjacent to each other.

In addition, the water blocking part 87 is configured to block water introduced into the fitting groove 83 through the parting line 152 and the water guide part 85 and guide the water to the water guide part 85 and the parting line 152.

The water blocking part 87 is bent in the side outer direction in the water guide part 85 and may be coupled to the fitting groove 83 along the vehicle width direction.

Furthermore, the above fitting groove 83 includes a fitting guide part 89. The fitting guide part 89 is configured to guide the fitting protrusion 81 to the fitting groove 83 when the fitting protrusion 81 is coupled to the fitting groove 83. The fitting guide part 89 is configured to substantially seal between the fitting protrusion 81 and the fitting groove 83.

In one example, the fitting guide part 89 may be formed in a round shape in the fitting groove 83.

According to the side structure 200 of the vehicle body according to another embodiment of the present invention configured as described above, the plurality of side outer panels 150 coupled to the surround panel 30 may be coupled through the fitting protrusion 81 and the fitting groove 83 by the fitting method.

Therefore, the side structure 200 of the vehicle body according to another embodiment of the present invention may secure the coupling rigidity of the plurality of side outer panels 150 by the fitting coupling of the fitting protrusion 81 and the fitting groove 83, thereby preventing the plurality of side outer panels 150 from being deformed.

Figure 8:
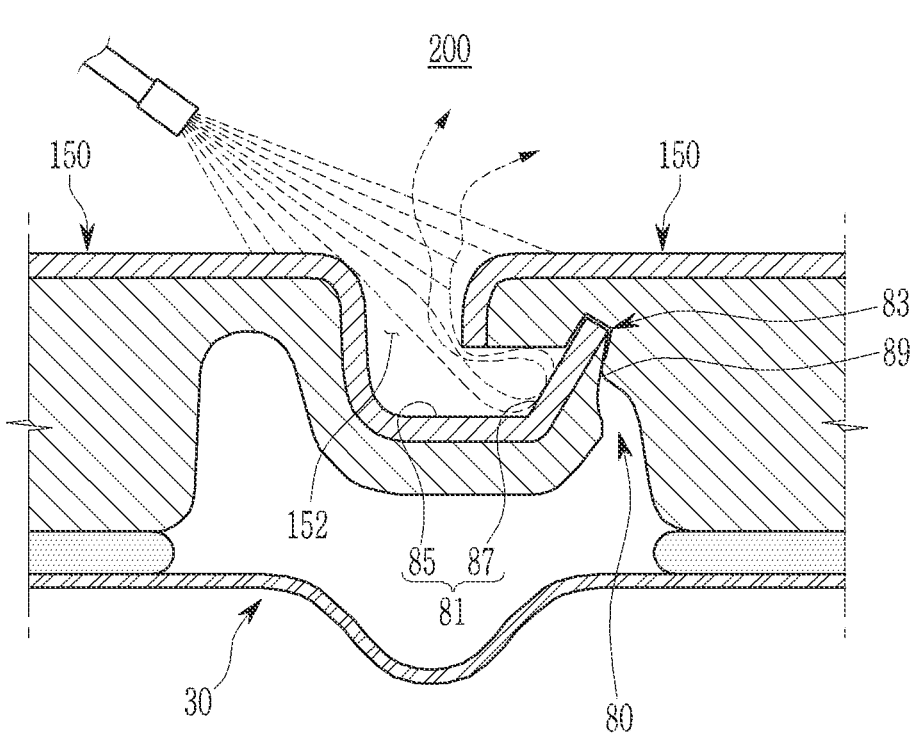
FIG. 8 is a diagram for describing an operation of a side structure of a vehicle body according to another embodiment of the present invention.

In addition, as illustrated in FIG. 8, in the side structure 200 of the vehicle body according to another embodiment of the present invention, water introduced into the parting line 152 between the plurality of side outer panels 150 adjacent to each other may be discharged in the downward direction through the water guide part 85 of the fitting protrusion 81.

Here, the water introduced into the water guide part 85 through the parting line 152 does not flow into the fitting groove 83 while being blocked by the water blocking part 87 and may be guided to the water guide part 85 and the parting line 152.

As a result, the side structure 200 of the vehicle body according to another embodiment of the present invention may improve the watertight performance of the plurality of side outer panels 150.

As described above, since the other configurations and operational effects of the side structure 200 of the vehicle body according to another embodiment of the present invention are the same as those of the above-described embodiment, a detailed description thereof will be omitted.

Although preferred embodiments of the present invention have been described above, embodiments of the present invention are not limited thereto, and embodiments of the present invention can be variously modified within the scope of the claims, the detailed description, and the appended drawings, and it is natural that various modifications also fall within the scope of the embodiments of the present invention.

What is claimed is:

1. A side structure of a vehicle body, the side structure comprising:
   a side body;
   a surround panel coupled to the side body and having a plurality of openings;
   a plurality of side outer panels comprising a plastic composite material and coupled to the surround panel; and
   a water drain unit provided on the surround panel,
   wherein:
   the surround panel comprises a panel mounting part provided at outer edges of the plurality of openings and bonded to the plurality of side outer panels by an adhesive, and
   the water drain unit comprises a water pass part provided on an outer edge of the panel mounting part.

2. The side structure of claim 1, wherein the surround panel comprises a reinforcement part extending from the panel mounting part and having a step shape at inner edges of the plurality of openings.

3. The side structure of claim 1, wherein:
   the surround panel comprises a plurality of panel mounting parts comprising the panel mounting part; and
   the water pass part extends from the outer edges of the plurality of openings between adjacent panel mounting parts of the plurality of panel mounting parts that are adjacent to each other.

4. The side structure of claim 1, wherein the water drain unit further comprises a plurality of water drain grooves connected to the water pass part in a vertical direction under the surround panel.

5. The side structure of claim 4, wherein the surround panel comprises a plurality of pillar reinforcement parts, a side sill reinforcement part, and a rear wheel arch reinforcement part.

6. The side structure of claim 5, wherein the plurality of water drain grooves are provided in the side sill reinforcement part and the rear wheel arch reinforcement part under the plurality of openings.

7. The side structure of claim 1, further comprising a panel coupling unit provided at edge portions of the plurality of side outer panels that are adjacent to each other.

8. The side structure of claim 7, wherein:
   the panel coupling unit comprises, at the edge portions of the plurality of side outer panels that are adjacent to each other;
   a fitting protrusion provided on a first edge portion of a first side outer panel of the plurality of side outer panels; and
   a fitting groove provided on a second edge portion of a second side outer panel adjacent to the first side outer panel, and
   the fitting groove of the second side outer panel is coupled to the fitting protrusion of the first side outer panel.

9. The side structure of claim 8, wherein the fitting protrusion is coupled to the fitting groove along a vehicle width direction.

10. The side structure of claim 8, wherein the fitting protrusion comprises:

a water guide part bent in a side inner direction at the first edge portion and connected to a parting line of the first side outer panel and the second side outer panel adjacent to each other; and a water blocking part bent in a side outer direction from the water guide part and coupled to the fitting groove along a vehicle width direction.

11. The side structure of claim 8, wherein the fitting groove is provided with a round-shaped fitting guide part to guide the fitting protrusion.

12. The side structure of claim 1, wherein each of the plurality of side outer panels comprises a plate part and a reinforcement layer on the plate part.

13. A vehicle comprising:

a vehicle body; and a pair of side structures respectively provided on both sides of the vehicle body and extending in a vehicle length direction, each of the pair of side structures comprising:

a side body;

a plurality of pillars spaced apart on the side body and extending in a vehicle height direction;

a side sill extending in the vehicle length direction at a lower end of the side body;

a rear wheel arch on the side body behind the side sill in the vehicle length direction;

a surround panel coupled to the side body and having an opening; and a side outer panel coupled to the surround panel, the side outer panel comprising a plastic composite material; and a water drain unit provided on the surround panel, wherein:

the surround panel comprises a panel mounting part provided at a first outer edge of the opening and bonded to the side outer panel by an adhesive, and the water drain unit comprises a water pass part provided on a second outer edge of the panel mounting part.

14. The vehicle of claim 13, wherein the surround panel further comprises:

a plurality of pillar reinforcement parts coupled to the plurality of pillars;

a side sill reinforcement part coupled to the side sill and connected to the plurality of pillar reinforcement parts; and a rear wheel arch reinforcement part coupled to the rear wheel arch and connected to the plurality of pillar reinforcement parts.

15. The vehicle of claim 13, wherein the side outer panel is coupled to an edge portion of the opening of the surround panel by the adhesive.

* * * * *